(12) United States Patent
Kuroda et al.

(10) Patent No.: US 7,812,468 B2
(45) Date of Patent: Oct. 12, 2010

(54) VEHICLE CONTROL SYSTEM

(75) Inventors: Daisuke Kuroda, Kariya (JP); Naoyuki Kamiya, Kariya (JP)

(73) Assignee: Denso Corporation, Kariya (JP)

( * ) Notice: Subject to any disclaimer, the term of this patent is extended or adjusted under 35 U.S.C. 154(b) by 520 days.

(21) Appl. No.: 11/953,620

(22) Filed: Dec. 10, 2007

(65) Prior Publication Data

US 2008/0185847 A1 Aug. 7, 2008

(30) Foreign Application Priority Data

Feb. 2, 2007 (JP) .............................. 2007-024296

(51) Int. Cl.
*H02P 9/04* (2006.01)
*F02M 1/00* (2006.01)

(52) U.S. Cl. ..................... 290/40 C; 320/104; 322/24

(58) Field of Classification Search ............... 290/40 R, 290/40 A, 40 B, 40 C; 322/24, 37; 320/104
See application file for complete search history.

(56) References Cited

U.S. PATENT DOCUMENTS

| | | | |
|---|---|---|---|
| 5,703,410 A | 12/1997 | Maekawa | |
| 6,208,931 B1 | 3/2001 | Schoettle et al. | |
| 6,949,902 B2 | 9/2005 | Nakayama et al. | |
| 7,098,628 B2 | 8/2006 | Maehara et al. | |
| 7,347,184 B2 * | 3/2008 | Kuroda et al. ................ | 123/434 |
| 7,356,402 B2 * | 4/2008 | Kuroda et al. ................ | 701/102 |
| 7,459,801 B2 * | 12/2008 | Shimoyama et al. ......... | 290/40 B |
| 7,473,206 B2 * | 1/2009 | Obayashi et al. ............. | 477/107 |
| 7,571,712 B2 * | 8/2009 | Kuroda et al. ................ | 123/434 |
| 7,710,068 B2 * | 5/2010 | Tani et al. ..................... | 320/104 |
| 2002/0097026 A1 | 7/2002 | Kernahan et al. | |
| 2004/0164616 A1 | 8/2004 | Obayashi et al. | |
| 2007/0252560 A1 | 11/2007 | Laufenberg et al. | |

FOREIGN PATENT DOCUMENTS

| | | |
|---|---|---|
| DE | 195 23 302 | 1/1997 |
| DE | 102 34 088 | 2/2004 |
| DE | 103 13 215 | 10/2004 |
| JP | 7-23599 | 1/1995 |
| JP | 9-14029 | 1/1997 |
| JP | 2004-260908 | 9/2004 |

OTHER PUBLICATIONS

German Official Action dated Sep. 3, 2008 issued in corresponding German Application No. 10 2007 000 618.9-32 with English translation.

* cited by examiner

*Primary Examiner*—Nicholas Ponomarenko
(74) *Attorney, Agent, or Firm*—Nixon & Vanderhye PC

(57) ABSTRACT

A control system for a vehicle has an engine control unit for an engine and a generator control unit for a power generator driven by the engine. The engine control unit calculates a permissive power generation torque, which is permitted to be used by the power generator, in accordance with a response delay of the engine. The generator control unit calculates a command power to be generated by the power generator so that a battery voltage variation and an engine speed variation are suppressed to be less than respective allowable variation limits, when a power difference is caused between a required power and a permissive power generated by the permissive torque.

6 Claims, 9 Drawing Sheets

VEHICLE CONTROL SYSTEM

CROSS REFERENCE TO RELATED APPLICATION

This application is based on and incorporates herein by reference Japanese Patent Application No. 2007-24296 filed on Feb. 2, 2007.

FIELD OF THE INVENTION

The present invention relates to a vehicle control system, which controls power generating operation of an electric power generator driven by an internal combustion engine.

BACKGROUND OF THE INVENTION

In recent years, more and more electric loads are mounted in a vehicle. Since these electric loads consume more electric power, an electric power generator such as an alternator is required to generate more power while an internal combustion engine for driving a vehicle is in operation. The power generator is driven by a part of torque of the engine. Therefore, the engine torque used by the power generator increases, as the power generation of the power generator increases to meet the increased power consumption.

When the power generator uses a large engine torque in a short period of time, it is likely that the engine rotation speed reduces causing deceleration of the vehicle. In the worst case, this speed reduction may cause an engine stall and shutdown of power supply resulting in breakdown of various electric systems in the vehicle.

To counter this drawback, JP 7-23599A proposes to gradually change a command power (target power to be generated) of a power generator to suppress both a rapid torque change of the power generator and a rapid speed change of an internal combustion engine. However, if the power generation is thus changed only gradually in spite of necessity of an instantaneous or rapid change of the electric power, the electric power actually generated will largely deviate from a required electric power and a variation in a battery voltage becomes large. As a result, vehicle-mounted electric loads, which are operated with the battery power, cannot operate stably. For instance, electronic computers in the vehicle may operate erroneously due to insufficient power supply.

SUMMARY OF THE INVENTION

It is therefore an object of the present invention to provide a vehicle control system, which controls power generation of a power generator so that both battery voltage variation and engine speed variation are suppressed to allowable levels even when a required electric power to be generated changes largely.

According to one aspect, a control system for a vehicle has an engine control unit for controlling an engine and a generator control unit for controlling a power generator driven by the engine to generate an electric power corresponding to a command power. The engine control unit calculates a permissive torque, which is permitted to be used by the power generator for electric power generation, in accordance with a response delay of the engine. The generator control unit calculates a required torque, which is required to generate a required power by the power generator. The generator control unit further calculates the command power so that a voltage variation of a battery and a rotation speed variation of the engine are limited to an allowable battery voltage level and an allowable engine speed level, respectively, when a power difference is caused between the required power and a permissive power generated by the permissive torque.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EMBODIMENT

First Embodiment

Figure 1:
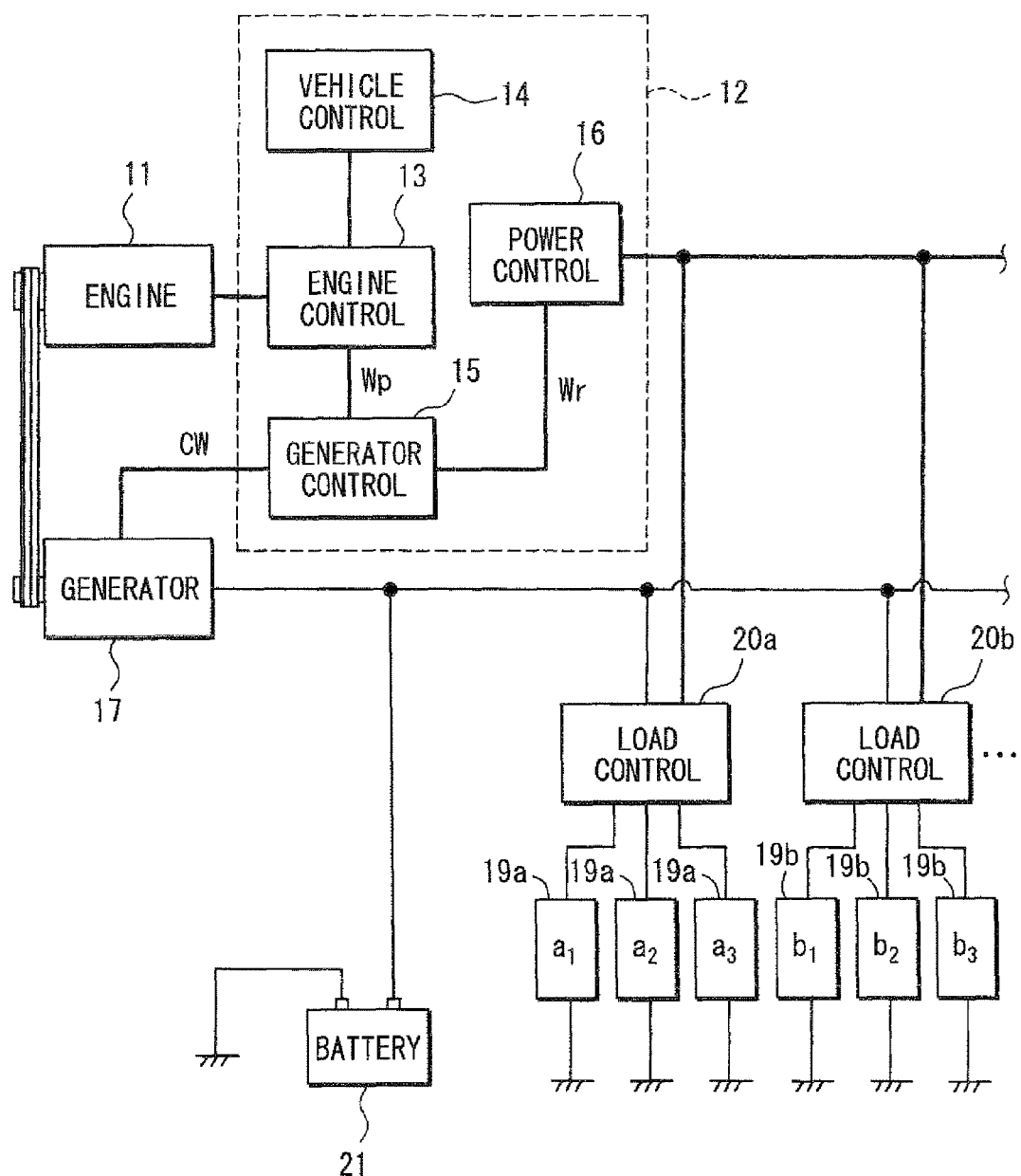
FIG. 1 is a block diagram showing a vehicle control system according to a first embodiment of the present invention.

Referring to FIG. 1, a vehicle control system is provided for a vehicle, in which an internal combustion engine 11 not only drives a vehicle but also an electric power generator (e.g., alternator) 17. The power generator 17 is connected to charge a battery 21. This control system includes an electronic control apparatus 12, which has an engine control unit 13, a vehicle control unit 14, a generator control unit 15 and a power control unit 16. These units 13 to 16 are connected via electric wires, when these units 13 to 16 are provided as separate microcomputers. Those units 13 to 16 may be integrated in one or a smaller number of microcomputers.

The vehicle control unit 14 calculates an engine torque, which is required to drive a vehicle, as a required vehicle drive torque. The vehicle control unit 14 applies the required vehicle drive torque thus calculated to the engine control unit 13.

The power control unit 16 is connected to load control units 20a, 20b, etc., which control respective electric loads, 19a, 19b, etc. The power control unit 16 detects operating conditions including consumed electric power of the loads 19a, 19b and a charge condition of the battery 21, and calculates an electric power, which is required to be generated by the power generator 17, as a required power Wr based on the detected operating conditions and the charge condition. The power control unit 16 applies the required power Wr thus calculated to the generator control unit 15.

The engine control unit 13 controls an air intake device, a fuel injection device, a spark ignition device, etc. (not shown) of the engine 11, so that the engine 11 produces an engine output torque, which includes the required vehicle drive torque calculated by the vehicle control unit 14 and a required power generation torque for driving the power generator 17 to generate the required power Wr. Further, the engine control unit 13 calculates an engine torque, which is permitted to be actually distributed and used by the power generator 17 for electric power generation, as a permissive power generation torque by estimating response delays (e.g., delays in intake air flow, throttle valve operation). The engine control unit 13 applies the permissive power generation torque thus calculated to the generator control unit 15.

The generator control unit 15 calculates an engine torque, which is required to drive the power generator 17 by the engine 11, as the required power generation torque based on the required power Wr, so that the power generator 17 is allowed to use this power generation torque. The required power generation torque is applied to the engine control unit 13. It is noted that the required power generation torque may be calculated by the engine control unit 13 in place of the generator control unit 15. The generator control unit 15 also calculates a permissive power Wp, which can be generated by using the permissive power generation torque calculated by the engine control unit 13. It is noted that the permissive power Wp may be calculated by the engine control unit 13 in place of the power generator control unit 15. This permissive power Wp, which will be actually generated by the power generator 17, differs from the required power Wr when, for instance, the required power Wr changes largely.

The generator control unit 15 therefore calculates a command power CW to be generated by the power generator 17 by correcting the permissive power Wp calculated from the permissive power generation torque by a corrective power Wc. The generator control unit 15 controls a current supply to the power generator 17, which is one of electric accessory devices in the vehicle. Specifically, it controls a field current supplied to a field coil of the power generator 17 based on the calculated command power CW so that the power generator 17 actually generates the command power CW.

When the permissive power Wp applied from the engine control unit 13 differs from the required power Wr applied from the power control unit 16, the generator control unit 15 calculates the command power CW by using the corrective power Wc to suppress a battery voltage variation ΔV in a voltage of the battery 21 and an engine speed variation ΔS in a rotation speed of the engine 11 so that the battery voltage variation ΔV and the engine speed variation ΔS do not exceed predetermined voltage variation limit Lv and speed variation limit Ls, respectively. That is, the generator control unit 15 calculates the command power CW to ensure certain allowances relative to the battery voltage variation limit Lv and the engine speed variation limit Ls.

Figure 2:
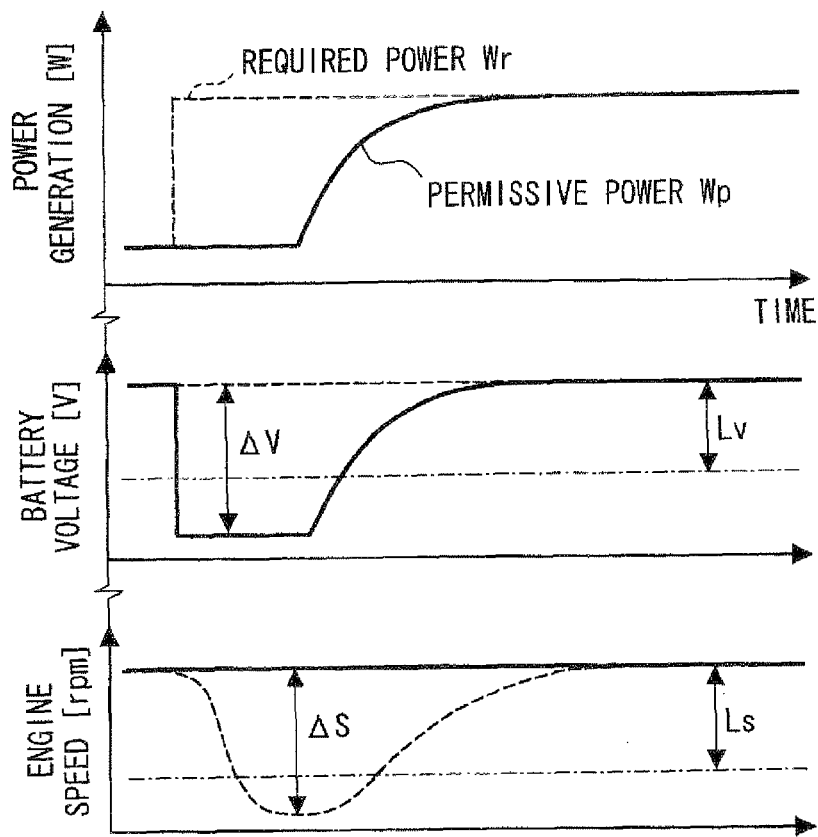
FIG. 2 is a time chart showing an operation of the vehicle control system when no power generation correction is made.

The engine control unit 13 and the generator control unit 15 therefore cooperatively control the power generator 17. FIG. 2 shows an exemplary control operation, in which it is assumed that the required power Wr changes in step as indicated by the dotted line.

The power generator 17 generates, by using a part of the engine torque (permissive torque), the permissive power Wp, which changes with some time delay due to a response delay of the engine 11, for instance, delays in the air intake operation and in the throttle operation, as indicated by the solid line.

If the power generator 17 is controlled to generate the required power Wr without delay by using more engine torque, so that the battery 21 charged with this permissive power Wp maintains its battery voltage having no voltage variation as indicated by the dotted line. However, the engine 11 loses its torque. As a result, the rotation speed of the engine 11 falls largely causing the engine speed variation ΔS of more than the variation limit Ls as indicated by the dotted line. If the deceleration is large, it will deteriorate drivability and, in the worst case, it will cause an engine stall.

If the power generator 17 is controlled to generate power by using only the permitted power generation torque, the engine rotation speed is maintained without decrease as indicated by the solid line. Instead, the voltage of the battery 21 falls largely causing the battery voltage variation ΔV of more than the variation limit Lv as indicated by the solid line. As a result, operation of the electric loads 19a, 19b become unstable and, in the worst case, the microcomputers, etc. will operate erroneously and be reset.

Figure 3:
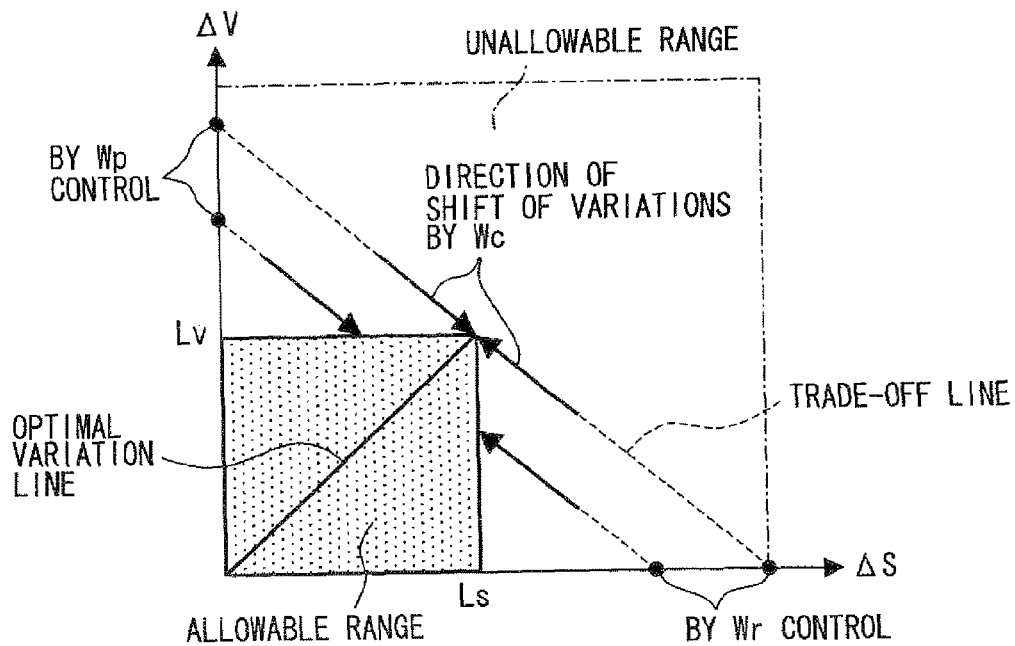
FIG. 3 is a graph showing a trade-off relation between an engine speed and a battery voltage.

Thus, the voltage variation ΔV of the battery 21 and the engine speed variation ΔS of the engine 11 are in a trade-off relation as shown in FIG. 3. That is, the battery voltage variation ΔV and the engine speed variation ΔS change on same power trade-off lines depending on the power generated by the power generator 17. The same power trade-off lines connect the battery voltage variation ΔV corresponding to the permissive power Wp calculated by the engine control unit 13 and the engine speed variation ΔS corresponding to the required power Wr calculated by the power control unit 16. A part of the trade-off lines are present in an allowable range, in which both the battery voltage variation and the engine speed variation are allowable. This allowable range is defined by the allowable battery voltage variation limit Lv and the allowable engine speed variation limit Ls. Therefore, by optimally controlling the command power CW, the battery voltage variation ΔV and the engine speed variation ΔS can be maintained within the respective allowable limits Lv and Ls.

To limit the battery voltage variation ΔV and the engine speed variation ΔS not to exceed the respective allowable limits Lv and Ls, it will be most desired to control the command power CW on line of an optimal voltage variation and speed variation line in the allowable range. This optimal variation line is most distanced from the allowable limit Lv of the battery voltage variation and the allowable limit Ls of the engine speed variation.

Figure 4:
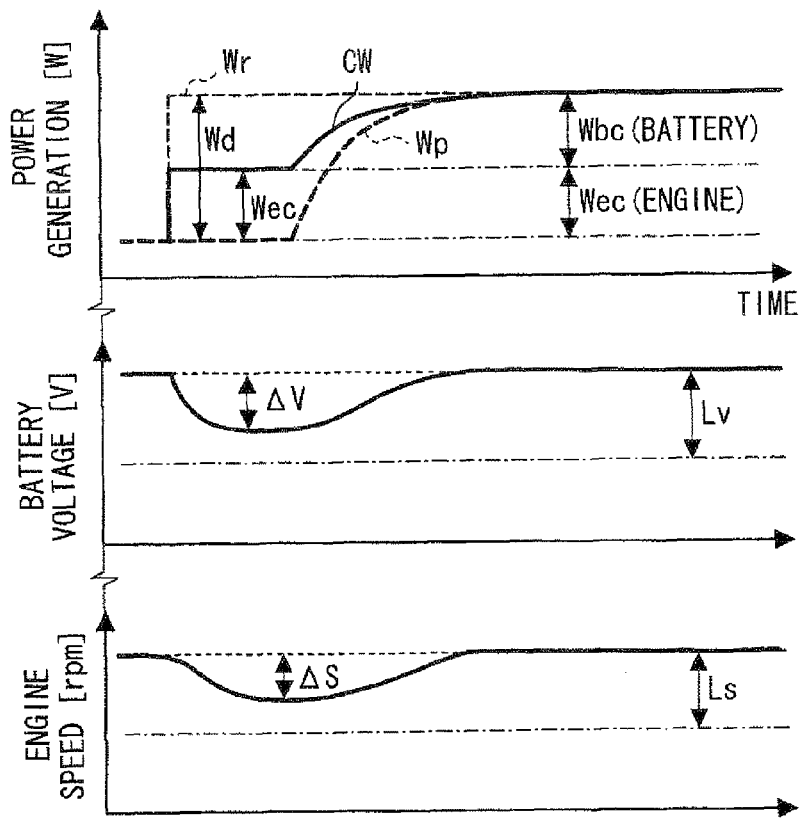
FIG. 4 is a time chart showing an operation of the first embodiment.
Figure 5:
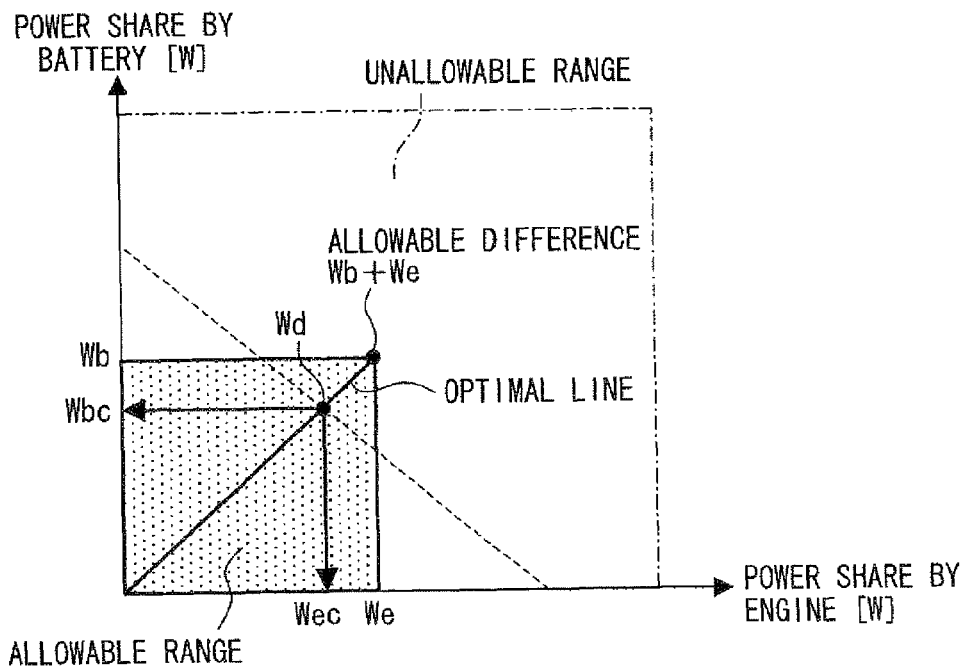
FIG. 5 is a graph showing a method of calculation of a corrective power in the first embodiment.

For the above reason, as shown in FIG. 4 and FIG. 5, the corrective power Wec is calculated as follows based on a difference Wd between the permissive power Wp and the required power Wr, a charge/discharge power Wb corresponding to the allowable voltage variation limit Lv of the battery 21, and a power variation We corresponding to the allowable speed variation limit Ls of the engine 11. By limiting the corrective power Wec to be less than We, a certain allowance is ensured relative to not only the allowable voltage variation limit Lv of the battery 21 but also the allowable speed variation limit Ls. That is, both battery voltage variation ΔV and the engine speed variation ΔS are suppressed to be less than the allowable voltage variation limit Lv and the allowable speed variation limit Ls, respectively.

$$Wec = Wd \times We/(Wb+We)$$

$$Wbc = Wd \times Wb/(Wb+We)$$

Here, the charge/discharge power Wb is positive and negative, when the battery 21 is charged and discharged, respectively. Both the charge/discharge power Wb corresponding to the allowable voltage variation limit Lv and the generated power variation We corresponding to the allowable speed variation limit Ls take the same polarity, i.e., positive and negative. The corrective power Wec may be calculated in different equations, so that the charge/discharge power corresponding to the voltage variation of the battery 21 is less than Wb and the generated power variation corresponding to the speed variation of the engine 11 is less than We.

Thus, the command power CW is calculated as follows by adding this corrective power Wec to the permissive power Wp.

$$CW = Wp + Wec$$

The allowable variation limits Lv and Ls of the battery voltage and the engine rotation speed may be set to low levels which are insensible by a vehicle driver, to higher levels which are required to maintain operations of the electric loads 19a, 19b and the engine 11 so that a system breakdown will not be caused, or other levels intermediate those levels.

The charge/discharge power Wb corresponding to the allowable voltage variation limit Lv of the battery 21 may be calculated as follows. Since the internal resistance Ri of the battery 21 varies with condition of the battery 21, the relation between the voltage variation ΔV and the charge/discharge power (electric power variation) ΔW of the battery 21 changes. Therefore, based on this relation, the internal resistance Ri is estimated by detecting the battery condition, and the charge/discharge power ΔW of the battery 21 is calculated by the following equation by using a simplified model of a battery shown in FIG. 6.

$$\begin{aligned}\Delta W &= (V+\Delta V) \times (I+\Delta I) - V \times I \\ &= V \times \Delta I + \Delta V \times I + \Delta V \times \Delta I \\ &= V \times \Delta V / Ri + \Delta V \times I + \Delta V^2 / Ri\end{aligned}$$

Here, V is a measured voltage of the battery 21, ΔV is a variation of the voltage V, I is a measured current of the battery 21, and ΔI (=ΔV/Ri) is a variation of the measured current I.

In this equation, the charge/discharge power (power variation) ΔW of the battery 21 becomes the charge/discharge power Wb corresponding to the allowable voltage variation limit Lv, when the voltage variation ΔV of the battery 21 becomes the allowable voltage variation limit Lv.

$$Pa = V \times \Delta V/Ri + \Delta V \times I + \Delta V^2/Ri$$

(ΔV=Lv: allowable voltage variation limit of the battery 21)

Figure 7:
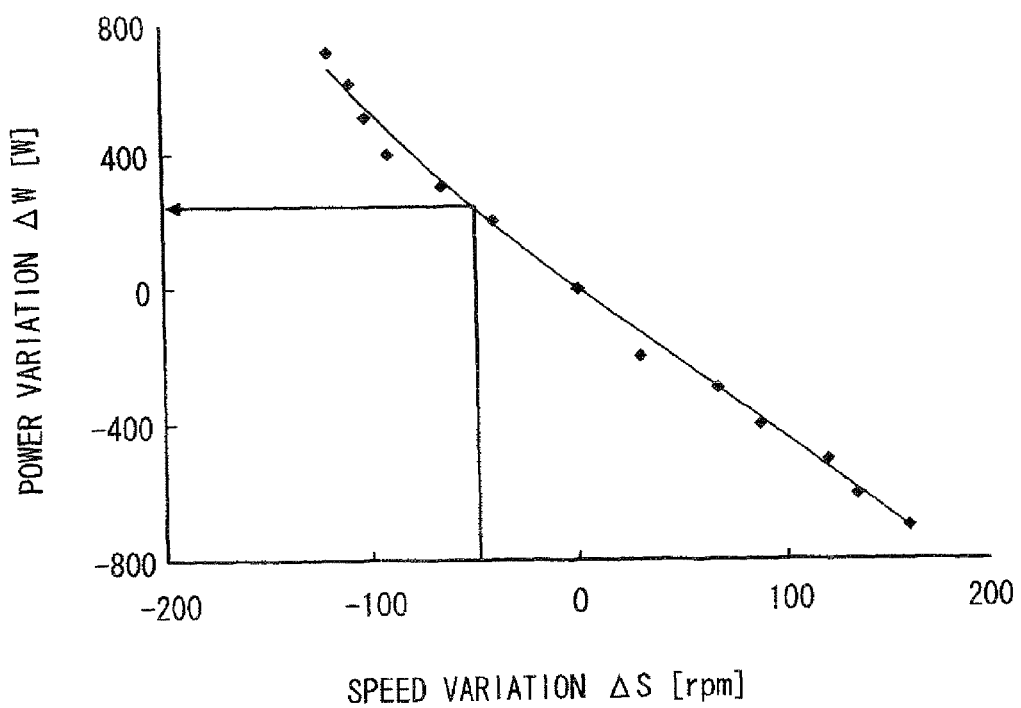
FIG. 7 is a graph showing a relation between an engine speed and a generated power.

Next, the power variation We corresponding to the allowable speed variation limit Ls of the engine 11 may be calculated as follows. As shown in FIG. 7, the relation between the speed variation of the engine 11 and the power variation of the power generator 17 is set based on experimental data, design data etc. by stored mapped data or mathematical calculation. The power variation calculated by the mapped data or the mathematical calculation when the speed variation of the engine 11 becomes the allowable speed variation limit Ls becomes the power variation We corresponding to the allowable speed variation limit Ls of the engine 11.

Figure 8:
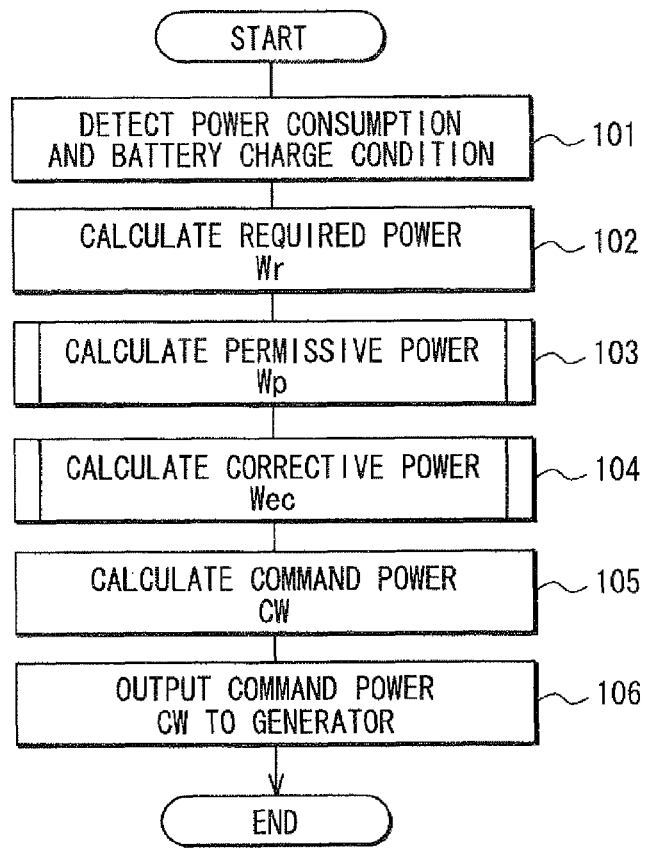
FIG. 8 is a flowchart showing a routine of command power calculation in the first embodiment.
Figure 9:
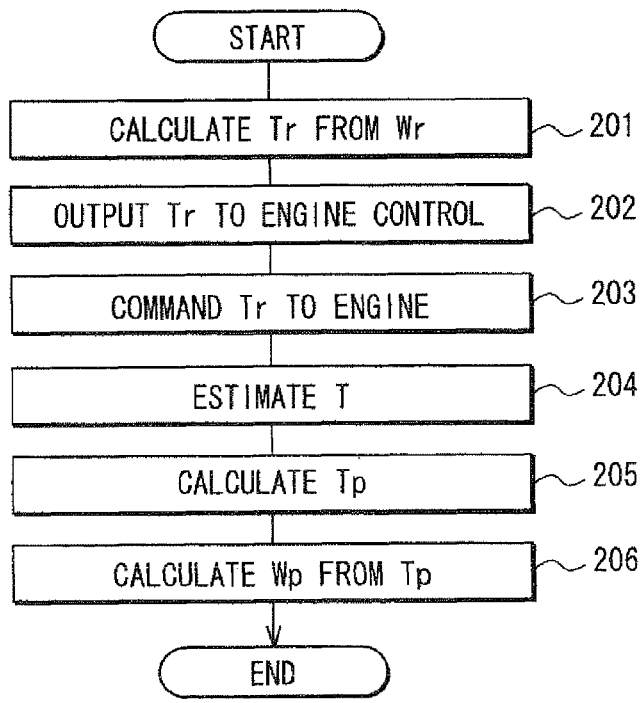
FIG. 9 is a flowchart showing a routine of permissive power calculation in the first embodiment.
Figure 10:
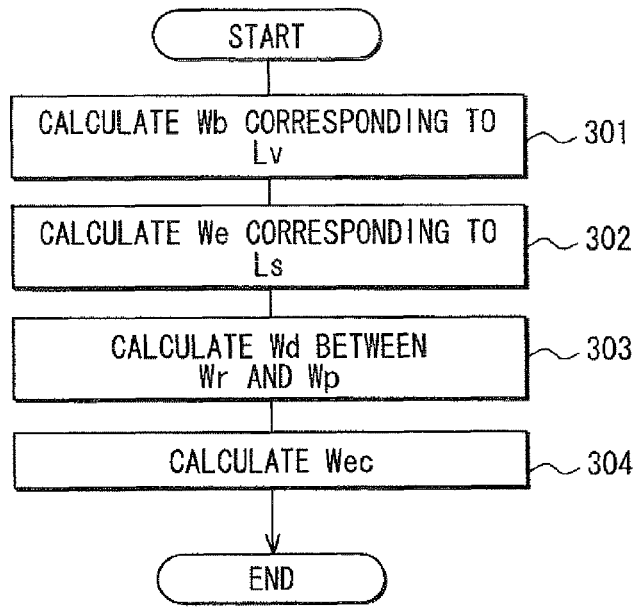
FIG. 10 is a flowchart showing a routine of corrective power calculation in the first embodiment.

The above cooperative power control for the power generator 17 by the engine control unit 13 and the generator control unit 15 is attained by executing routines shown in FIGS. 8 to 10.

(Command Power Calculation Routine)

The command power calculation routine of FIG. 8 is executed at a predetermined interval during the engine operation. First, at step 101, the power consumption by the electric loads 19a, 19b, etc. and the charge condition of the battery 21 are detected. At next step 102, the required power Wr, which is required to be generated by the power generator 17, is calculated based on the power consumption by the electric loads 19a, 19b, etc. and the charge condition of the battery 210.

Then, at step 103, the permissive power Wp, which will be possibly generated by the permissive generation torque, is calculated by executing the permissive power calculation routine shown in FIG. 9. At step 104, by executing the corrective power calculation routine shown in FIG. 10, the corrective power Wec is calculated to ensure a predetermined allowance relative to the allowable battery voltage variation limit Lv and the allowable engine speed variation limit Ls. Specifically, the corrective power Wec is calculated by using the difference Wd between the permissive power Wp and the required power Wr, the charge/discharge power Wb corresponding to the allowable battery voltage variation limit Lv and the power variation We corresponding to the allowable engine speed variation limit Ls.

Then, at step 105, the command power CW is calculated by adding the corrective power Wec to the permissive power Wp.

$$CW = Wp + Wec$$

Finally, at step 106, the command power CW is output to the power generator 17, so that the field current supplied to the field coil of the power generator 17 is controlled for regulating the power generation of the generator to the command power CW.

[Permissive Power Calculation Routine]

The permissive power calculation routine is executed as shown in FIG. 9 as a sub-routine executed at step 103. In this sub-routine, at step 201, the required engine torque Tr, which is required to drive the power generator 17, is calculated by the generator control unit 15 based on the required power Wr. This calculated torque is output to the engine control unit 13 at step 202.

At next step 203, generation of this torque is commanded to engine control devices. Then, at step 204, an engine torque T, which will be generated, is estimated. At step 205, the permissive torque Tp, which may be distributed to or shared by the power generator 17 is calculated in view of the response delay (air intake response delay, throttle operation delay, etc). Then, at step 206, the permissive power Wp, which will be generated by the permissive torque Tp, is calculated from the permissive torque Tp.

(Corrective Power Calculation Routine)

The corrective power calculation routine is executed as shown in FIG. 10 as a sub-routine executed at step 104. In this sub-routine, at step 301, the charge/discharge power Wb corresponding to the allowable voltage variation limit Lv of the battery 21 is calculated by using the simplified battery model of FIG. 6. At next step 302, the power variation We corresponding to the allowable speed variation limit Ls of the engine 11 is calculated by using the mapped data of FIG. 7 or the mathematical equation. The step 302 may be executed before the step 301 is executed. Then, at step 303, the power difference Wd between the permissive power Wp and the required power Wr is calculated. Finally, at step 304, the corrective power Wec is calculated as follows by using the power difference Wd, the charge/discharge power Wb and the power variation We.

$$Wec = Wd \times We/(Wb+We)$$

According to the first embodiment, when the power difference Wd arises between the required power Wr and the permissive power Wp, which will be generated by the permissive torque Tp, as shown in FIG. 4, the corrective power Wec is calculated to ensure the allowances relative to the allowable battery voltage variation limit Lv and the engine speed variation limit Ls. The final command power CW, which should be generated by the power generator 17, is calculated by correcting the permissive power Wp by the corrective power Wc. Therefore, the power generation of the power generator 17 can be controlled so that both the voltage variation $\Delta V$ of the battery 12 and the speed variation $\Delta S$ of the engine 11 are reduced to be within respective allowable limits Lv and Ls. As a result, the unstable operation of the electric loads 19$a$, 19$b$ due to battery voltage variation and the uncomfortable deceleration due to the engine rotation speed variation will not be caused.

Second Embodiment

Figure 11:
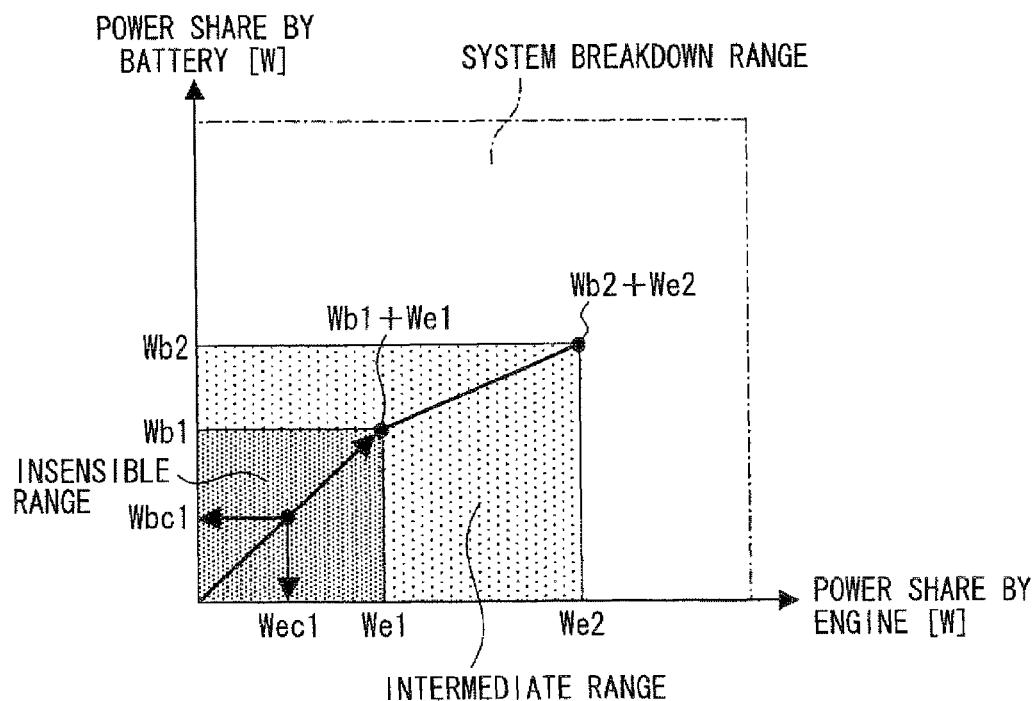
FIG. 11 is a flowchart showing a routine of corrective power calculation performed for power generation control in a variation insensible area according to a second embodiment of the present invention.
Figure 12:
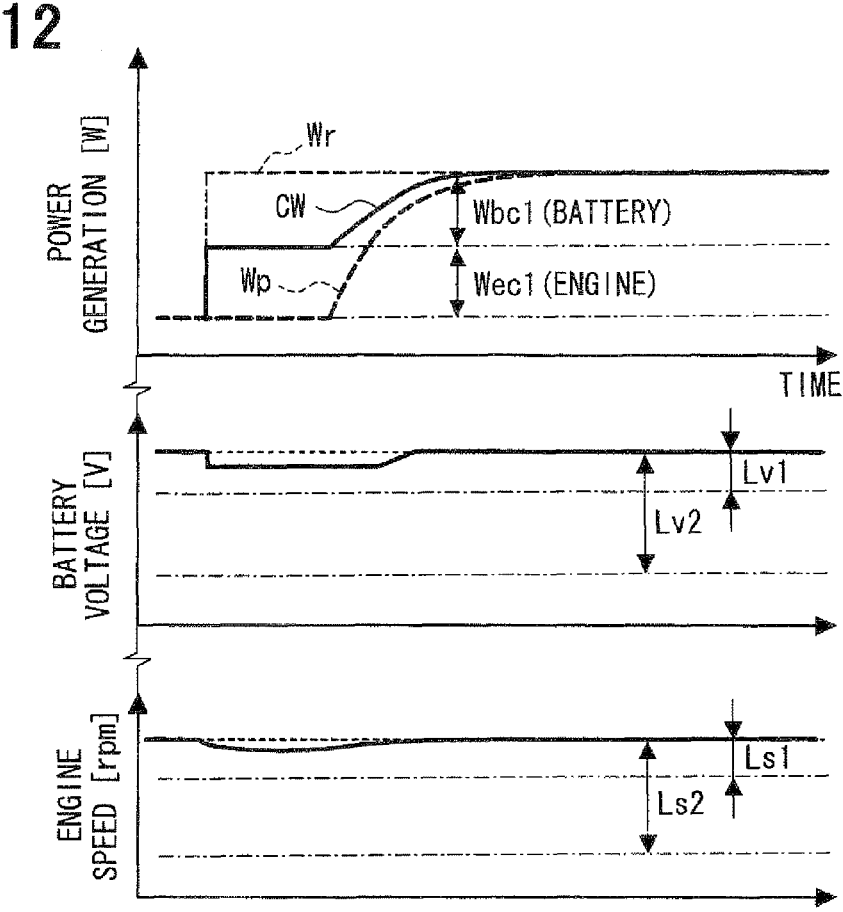
FIG. 12 is a time chart showing an operation of the second embodiment when the power generation control is performed in the variation insensible area.
Figure 13:
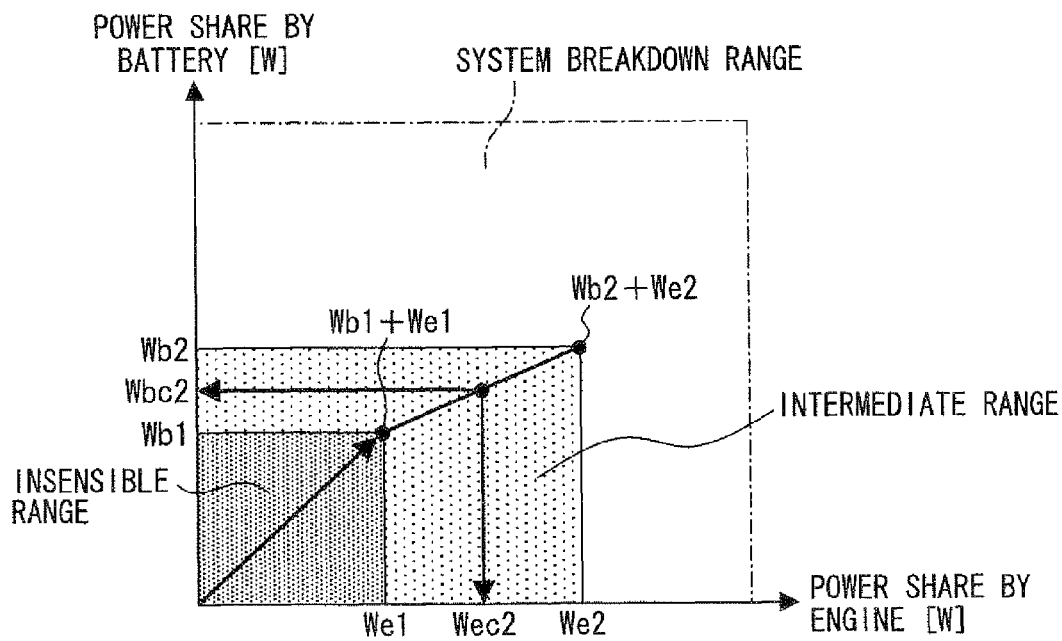
FIG. 13 is a flowchart showing a routine of corrective power calculation performed outside a system breakdown area according to the second embodiment.
Figure 14:
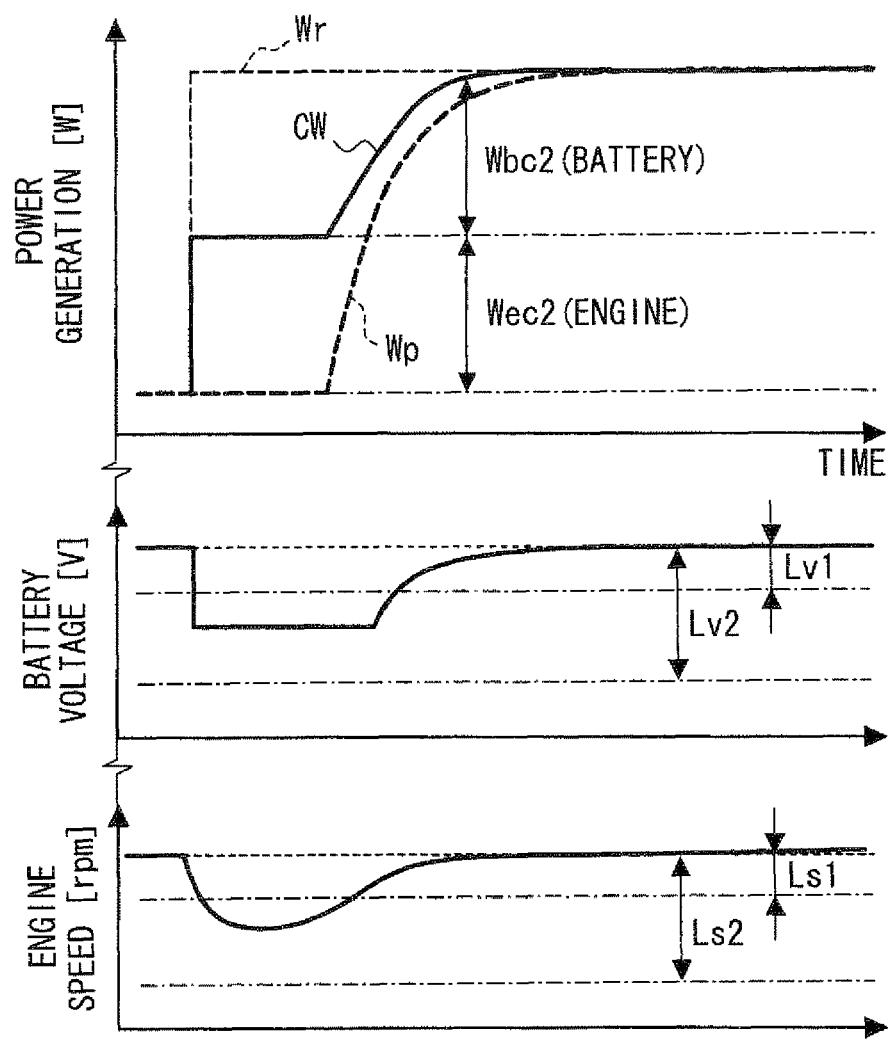
FIG. 14 is a time chart showing an operation of the second embodiment when the power generation control is performed outside the system breakdown area.

In the second embodiment, the allowable battery voltage variation limit Lv and the allowable engine speed variation limit Ls are set to a plurality of limit levels, for instance two limit levels, respectively. Specifically, the battery voltage variation limit Lv and the engine speed variation limit Ls are set to respective first limits Lv1 and Ls1, and to respective second limits Lv2 and Ls2, as shown in FIGS. 12 and 14. The first limits Lv1 and Ls1 define an insensible range in FIG. 11, in which a vehicle driver will not sense the battery voltage variation and the engine speed variation. The second limits Lv2 and Ls2 define an intermediate area in FIG. 11, in which a vehicle driver will sense the battery voltage variation or the engine speed variation but the control system will not break down so that a minimum battery voltage is maintained to operate the electric loads 19$a$, 19$b$ and the engine stall is not caused.

In the insensible area, a charge/discharge power Wb1 of the battery 21 is set to correspond to the allowable voltage variation limit Lv1, and a power variation We1 is set to correspond to the allowable speed variation limit Ls1. In the insensible area, a charge/discharge power Wb2 of the battery 21 larger than Wb1 is set to correspond to the allowable voltage variation limit Lv2, and a power variation We2 larger than We1 is set to correspond to the allowable speed variation limit Ls2.

Figure 6:
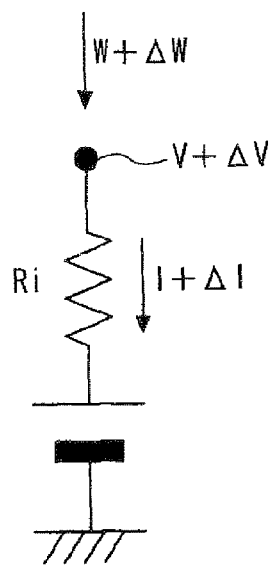
FIG. 6 is a circuit diagram showing a simplified electric model of a battery characteristic.

The charge/discharge powers Wb1, Wb2 corresponding to the allowable battery limits Lv1, Lv2 may be determined based on the simplified battery model shown in FIG. 6, and the power variations We1, We2 corresponding to the allowable engine speed variation limits Ls1, Ls2 may be determined based on the mapped data shown in FIG. 7.

The power difference |Wd| between the permissive power Wp and the required power Wr is compared with a first threshold level |Wb|+We1| defining a limit of the insensible range. If |Wd|<|Wb1+We1|, it is considered to be possible to control the power generation of the power generator 17 without being sensed by a vehicle driver. Therefore, a first corrective power Wec1 is calculated as follows.

$$Wec1 = Wd \times We1/(Wb1+We1)$$

$$Wbc1 = Wd \times Wb1/(Wb1+We1)$$

If |Wd|≧|Wb1+We1|, it is considered that the battery voltage variation or the engine speed variation will be sensed by a vehicle driver. In this case, the power difference |Wd| is further compared with a second threshold level |Wb2+We2| defining a limit of the intermediate range to check whether it is in intermediate range or the system breakdown range. If |Wb1+We1|≦|Wd|<|Wb2+We2|, it is considered to be possible to control the power generation of the power generator 17 without causing the system breakdown. Therefore, a second corrective power Wec2 is calculated as follows.

$$Wec2 = [Wd - (Wb1 + We1)] \times$$
$$(We2 - We1)/[(Wb2 + We2) - (Wb1 + We1)] + We1$$
$$Wbc2 = [Wd - (Wb1 + We1)] \times$$
$$(Wb2 - Wb1)/[(Wb2 + We2) - (Wb1 + We1)] + Wb1$$

If |Wd|≧|Wb2+We2|, it is considered that the engine stall and computer resetting will be caused. Therefore, no control is executed.

Figure 15:
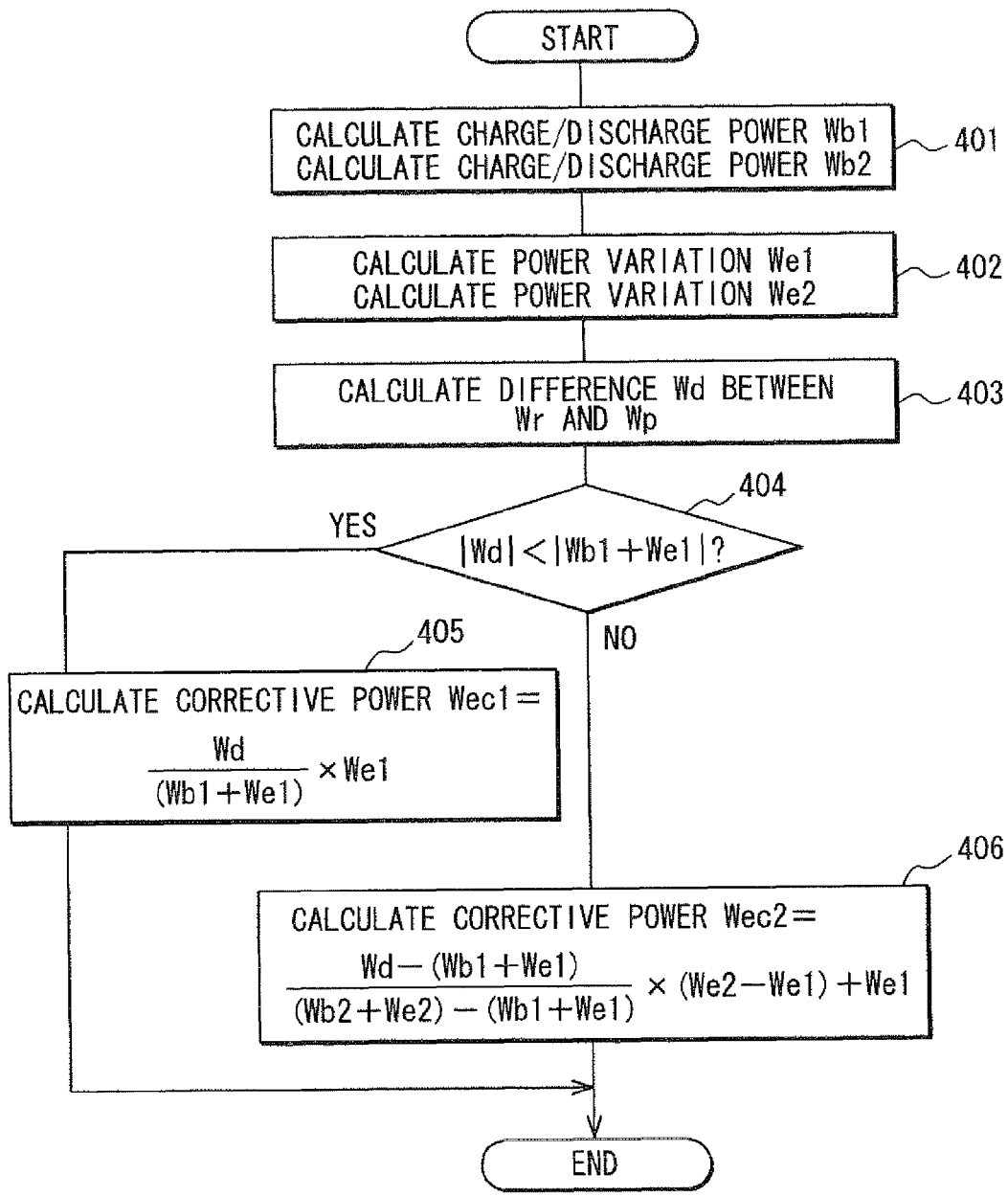
FIG. 15 is a flowchart showing a routine of corrective power calculation in the second embodiment.

In the second embodiment, the corrective powers Wec1 and Wec2 are calculated by executing a corrective power calculation routine shown in FIG. 15 in place of the sub-routine shown in FIG. 10 of the first embodiment. Other routines are executed in the similar manner as in the first embodiment. For instance, the command power CW is calculated by adding the corrective power Wec1 or Wec2 in the sub-routine of FIG. 10 to the permitted power Wp calculated by the sub-routine of FIG. 9, and output to the power generator 17.

In the corrective power calculation routine shown in FIG. 15, at step 401, the charge/discharge powers Wb1 and Wb2 are calculated. The power Wb1 corresponds to the allowable voltage variation limit Lv1, below which a vehicle driver will not sense voltage variations. The power Wb2 corresponds to the allowable voltage variation limit Lv2, below which the system will not break down although the vehicle driver will sense voltage variations.

At next step 402, the power variations We1 and We2 are calculated. The power variation We1 corresponds to the allowable speed variation limit Ls1, below which a vehicle driver will not sense speed variations. The power variation We2 corresponds to the allowable speed variation limit Ls2, below which the system will not break down although the vehicle driver will sense voltage variations.

At step 403, the power difference |Wd| between the required power Wr and the permissive power Wp is calculated. Then, at step 405, this power difference |Wd| is compared with a threshold level |Wb1+We1|, which is for distinguishing the insensible area and the intermediate area. If |Wd|<|Wb1+We1|, it is considered to be possible to control the power generation of the power generator 17 without causing sensible variations. In this case, as in the first embodiment, the first corrective power Wec1 is calculated as follows at step 405.

$$Wec1 = Wd \times We1/(Wb1+We1)$$

If |Wd|≧|Wb1+We1|, the second corrective power Wec2 is calculated as follows at step 406.

$$Wec2 = [Wd - (Wb1 + We1)] \times$$
$$(We2 - We1)/[(Wb2 + We2) - (Wb1 + We1)] + We1$$

According to the second embodiment, in the case of $|Wd|<|Wb1+We1|$, the power generator 17 can be controlled as shown in FIG. 12 without causing a vehicle driver to sense battery voltage variations and engine speed variations. Further, in the case of $|Wd|\geq|Wb1+We1|$, the power generator 17 can be controlled as shown in FIG. 14 without causing a system breakdown, so that a minimum battery voltage of the electric loads 19*a*, 19*b* can be maintained and the engine stall can be prevented.

In the second embodiment, the allowable battery limit and the allowable engine speed variation limit may be changed to more than two levels in accordance with the power difference $|Wd|$, respectively.

The above embodiments may be modified in various ways without departing from the scope of the appended claims.

What is claimed is:

1. A control system for a vehicle having an engine for producing an output torque, a battery for supplying electric power to an electric load, and a power generator driven by the output torque for generating electric power to charge the battery, the control system comprising:
   an engine control means;
   a generator control means for controlling the power generator to generate an electric power corresponding to a command power,
   a required torque calculation means for calculating a required torque required to generate a required power by the power generator;
   a permissive torque calculation means for controlling the engine to produce the required torque and for calculating a permissive torque permitted to be used by the power generator to generate a permissive power in accordance with a response delay of the engine,
   wherein the generator control means calculates the command power so that a battery voltage variation and an engine speed variation are suppressed to be less than an allowable battery voltage variation limit and an allowable engine speed variation limit, respectively, when a power difference is caused between the required power and the permissive power.

2. The control system according to claim 1, wherein:
   the generator control means calculates a corrective power based on the power difference, a charge/discharge power corresponding to the allowable battery voltage variation limit, and a power variation corresponding to the allowable engine speed variation limit; and
   the generator control means further calculates the command power by correcting the permissive power with the corrective power.

3. The control system according to claim 1, wherein:
   the generator control means changes the allowable battery voltage variation limit and the allowable engine speed variation limit to a plurality of levels, respectively, in accordance with the power difference.

4. The control system according to claim 3, wherein:
   the plurality of levels includes a first level for defining a range in which the battery voltage variation and the engine speed variation are insensible to a vehicle driver, and a second level for defining a range in which a minimum battery voltage required for operating the electric load is provided and an engine stall is prevented.

5. The control system according to claim 2, wherein:
   the generator control means calculates the power variation corresponding to the allowable engine speed variation limit in accordance with a characteristic defining a relation between a speed variation of the engine and a power variation of the power generator.

6. The control system according to claim 2, wherein:
   the generator control means estimates an internal resistance of the battery based on a battery condition, and calculates the charge/discharge power corresponding to the allowable battery voltage variation limit.

* * * * *